(12) United States Patent
Bajaj et al.

(10) Patent No.: US 11,315,201 B2
(45) Date of Patent: Apr. 26, 2022

(54) INTELLIGENT BILL OF MATERIALS ADVISOR

(71) Applicant: ACCENTURE GLOBAL SOLUTIONS LIMITED, Dublin (IE)

(72) Inventors: Nitin Bajaj, Overland Park, KS (US); Teresa Sheausan Tung, Tustin, CA (US); Sonali Parthasarathy, San Francisco, CA (US); Reymonrod Geli Vasquez, Vallejo, CA (US); Steven Robert Roberts, Burlingame, CA (US); Colin Anil Puri, Walnut Creek, CA (US); Elizabeth Ann Shay, San Francisco, CA (US); Unnati Amin, Voorhees, NJ (US); Michael Nai-An Chen, San Francisco, CA (US); Analiz Cabrera Hernandez, Somerville, MA (US); Trinidy Ray Combs, Minneapolis, MN (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 17/022,683

(22) Filed: Sep. 16, 2020

(65) Prior Publication Data
US 2021/0224929 A1    Jul. 22, 2021

Related U.S. Application Data

(60) Provisional application No. 62/964,107, filed on Jan. 21, 2020.

(51) Int. Cl.
G06Q 50/08 (2012.01)
G06Q 10/06 (2012.01)
G06Q 10/08 (2012.01)

(52) U.S. Cl.
CPC ....... *G06Q 50/08* (2013.01); *G06Q 10/06313* (2013.01); *G06Q 10/0875* (2013.01)

(58) Field of Classification Search
CPC ......... G06Q 30/0631; G06Q 10/06313; G06Q 10/0875
See application file for complete search history.

(56) References Cited

U.S. PATENT DOCUMENTS 6,625,454 B1 * 9/2003 Rappaport ............ H04W 16/20
455/422.1
10,713,737 B1 * 7/2020 Blackburn ............. G06Q 50/08
(Continued)

OTHER PUBLICATIONS

Tixier, Antoine J.-P., Vazirgiannis, Michalis, Hallowell, Matthew R. Word Embedding for the Construction Domain. (Year: 2016).*
(Continued)

*Primary Examiner* — Johnna R Loftis
(74) *Attorney, Agent, or Firm* — Crowell & Moring LLP

(57) ABSTRACT

A method and system for intelligently generating Bill of Materials (BoM) and tracking components of a build site. The method and system include querying a knowledge graph for a collection of historical bill of materials (BoMs), automatically generating a digital twin of a built site based on a selected group of completed build site, and intelligently generating the BoM for the digital twin based on BoMs of the selected group of completed built site.

17 Claims, 14 Drawing Sheets

(56) References Cited

U.S. PATENT DOCUMENTS

| | | | |
|---|---|---|---|
| 2006/0136180 A1* | 6/2006 | Hansen | G06Q 50/04 703/1 |
| 2009/0128558 A1* | 5/2009 | Morello | G05B 19/4097 |
| 2016/0098256 A1* | 4/2016 | Tehrani | G06F 8/10 717/107 |
| 2017/0206292 A1* | 7/2017 | Bennett | G06F 30/18 |
| 2018/0144084 A1* | 5/2018 | Burke | G06F 30/30 |
| 2019/0188338 A1* | 6/2019 | Srivastava | G06F 30/13 |
| 2019/0325628 A1* | 10/2019 | Dubey | G06F 16/3329 |
| 2020/0133970 A1* | 4/2020 | Khabiri | G06F 40/30 |
| 2020/0134560 A1* | 4/2020 | McLinden | G06Q 50/08 |
| 2020/0333772 A1* | 10/2020 | Srivastava | G06Q 10/06 |

OTHER PUBLICATIONS

Kusner, Matt J., Sun, Yu, Kolkin, Nicholas I., Weinberger, Kilian Q. From Word Embedding to Document Distances. Proceedings of the 32nd International Conference on Machine Learning. (Year: 2015).*

\* cited by examiner

Figure 9

INTELLIGENT BILL OF MATERIALS ADVISOR

CROSS REFERENCE

This application claims priority to U.S. Provisional Patent Application No. 62/964,107 filed on Jan. 21, 2020, which is herein incorporated by reference in its entirety.

BACKGROUND

Technical Field

This application describes a method and system for intelligent and automatic generation of Bill of Materials (BoM) to facilitate efficient equipment manufacturing and/or site construction.

Description of Related Art

Equipment manufacturers, general contractors, builders, etc., typically establish and maintain a BoM to track constituent components of equipment or elements and items for a construction site. For example, a contractor of a mobile phone carrier to build a cellular site may generate a BoM that specifies all the equipment, components, subassemblies, etc. that, when assembled, form the cell site and cellular equipment therein.

A BoM is ordinarily required in purchasing and assembly/construction operations for equipment manufacturing and/or site construction. For example, a purchasing entity may stock its inventory and/or generate component orders to suppliers based on the BoM. Likewise, assembly/construction operators may utilize the BoM to gather components for assembling the equipment and/or constructing the site.

BRIEF SUMMARY

Several embodiments include a system and/or method for automatic generation of a BoM for a new construction project. The method includes obtaining a plurality of predefined properties associated with the new construction project and automatically querying a knowledge graph to obtain a population of construction projects with project characteristics that best match the plurality of the predefined properties of the new construction project in a multi-dimensional vector space, the population of construction projects collectively forming a digital representation of the new construction project. The method further includes retrieving, from the knowledge graph, a set of BoMs associated with the population of construction projects, and automatically aggregating the set of BoMs to generate a base BoM for the new construction project.

BRIEF DESCRIPTION OF THE DRAWINGS

FIG. 9 shows an exemplary user interface for the BoM advisor of FIG. 3 for displaying a base BoM and suggestions for additional components for the digital twin of FIG. 6.

DETAILED DESCRIPTION

Figure 1:
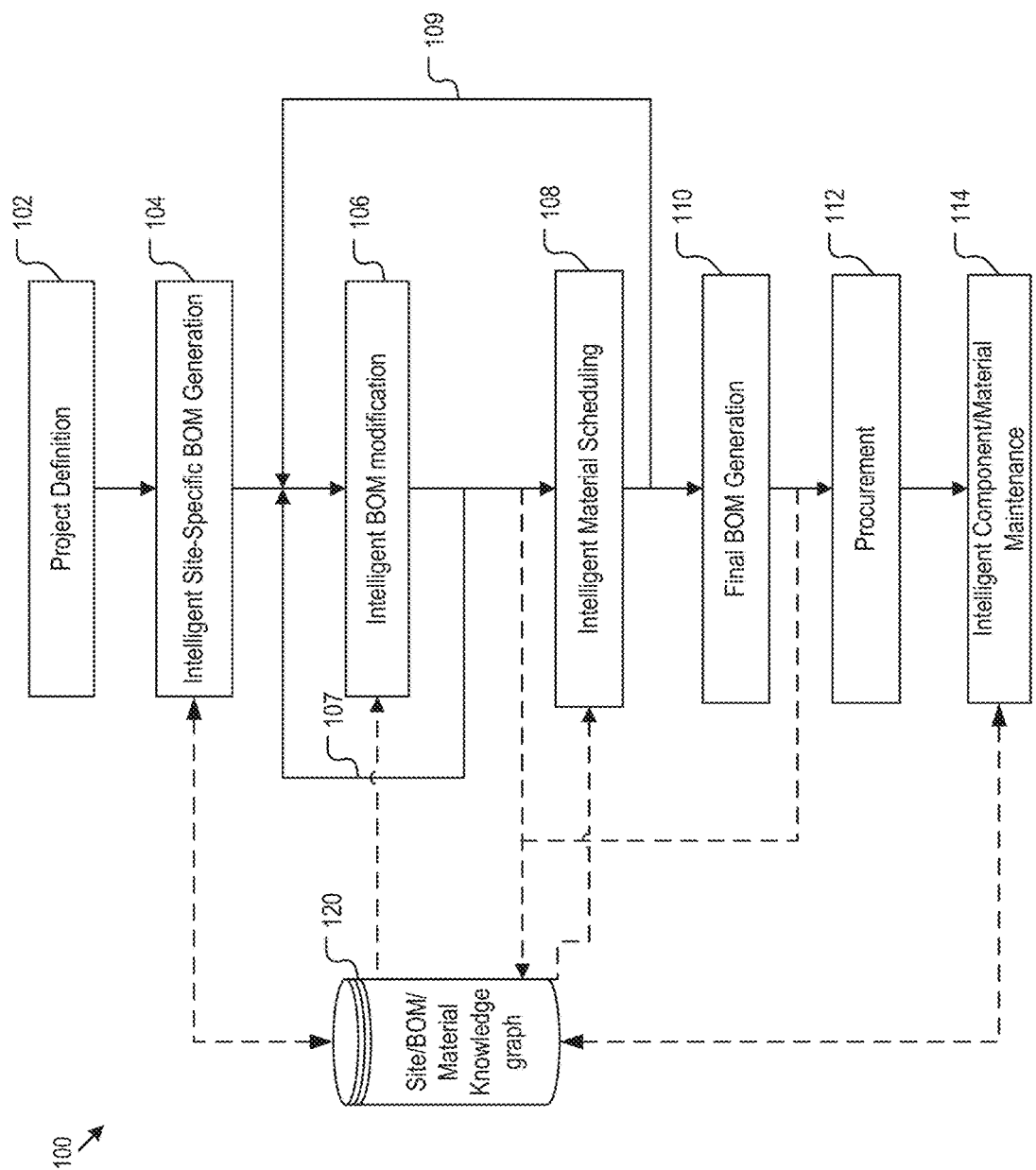
FIG. 1 illustrates an exemplary process and logic flow for an intelligent site construction.

A Bill of Materials (BoM) may be used, for example, to track constituent parts for manufacturing a product, or elements, items, equipment, and/or materials for a construction site or project. The parts, elements, equipment, items, and/or materials are collectively referred to as components. A BoM may contain a list of key components as well as other less critical components for the equipment or construction site. The BoM may be used as a basis for a supply chain to procure the components (or stock a component inventory) and for manufacturing or construction operators to generate plans and timelines for assembling the equipment or constructing the site.

The list of components in the BoM may be numerous, and each component may be associated with various properties, including but not limited to general properties such as prices, availability, lead time, reliability, and the like, and other properties specific to the particular equipment being manufactured and particular site being constructed. These properties of all the components in the BoM collectively affect a trade-off between cost and time (e.g., a time duration needed to complete the manufacturing of the product or the construction of the site) in complex manners that are difficult to track manually.

In addition, while repetitive manufacturing of a plurality of products or construction of a plurality of sites may be generally based a template BoM generated from an existing equipment or site, in many applications, there may be variations in the products and the sites and evolution of components and their suppliers over time, requiring adaptation or frequent modification of the template BoM. Timely and error-free adaptation and modification of a template BoM to suit evolving products or site are critical for efficient product manufacturing and site construction. Relying mostly on manual BoM adaptation and modification may become error-prone and unmanageable, if not impossible.

As a particular non-limiting example, a mobile service provider or mobile network carrier may construct a plurality of cellular sites within various geographical areas to provide mobile communication coverage for their mobile users. A need for construction of a particular mobile cellular site may arise when the communication capacity of existing cellular sites becomes insufficient to support an increasing number of mobile users and/or an increasing amount of mobile communication traffic in a particular geographic area, or when a new generation of cellular equipment are being rolled out over time to replace or supplement an earlier generation at the same or different cellular sites. Such cellular sites, for example, may include but are not limited to various types of base stations and mobile anchor or access points (either distributed or central) associated with 4th Generation (4G), 4G Long Term Evolution (LTE), or 5th Generation (5G) cells, microcells, pico-cells, or femtocells. The construction of a cellular site, for example, may include building a radio tower and/or installing/assembling mobile base stations. A plurality of cellular sites may be constructed over time. The construction of a cellular site may be based on a BoM. BoMs between different cellular sites may be correlated yet different, as a result of their general similarity in many basic components but different environmental conditions leading to different requirements on, for example, RF signal generation, signal interference, and communication interface to backhaul network and other data networks. Such differences may be difficult to track manually.

This disclosure describes an automated intelligent BoM builder that facilitates more comprehensive, efficient, adaptive, and accurate generation of BoMs for equipment manufacturing and site construction. Such intelligent BoM builder may be used in conjunction with other intelligent BoM modules (e.g., a tracking and maintenance system and data store for providing component services to the product or site post manufacturing or construction, and for suppling information for generating future BoMs), thereby forming an intelligent BoM advisor. While the particular embodiments below are described in the context of construction of cellular sites for mobile communications by a mobile service provider or mobile network carrier, the underlying principles are applicable to construction of other types of sites, manufacturing of various types of products, or other engineering tasks that involve complex BoMs.

The Intelligent BoM builder disclosed herein is capable of harnessing and utilizing site features, project objectives, historical asset requirements, and post-asset deployment quality feedbacks to enable automatic generation of more accurate and optimized BoMs that adapt to changing properties associated with the sites and components, and select components based on balancing trade-offs between lead time, construction time, component reliability, and post-construction maintenance cost. The BoMs generated in such a manner generally provide higher quality materials, less lead time, lower cost by mitigating site-construction delays caused by missing materials and operational cost caused by mismatched and low-quality materials that will need servicing and replacement. Such an intelligent BoM builder is applicable to various types of site constructions and product manufacturing, and is especially helpful in the context of mobile networks for building new cell sites, or upgrading cell sites with next generation technology, or performing incremental upgrade to increase cell-site capacity or improve existing cell-site service.

The intelligent BoM builder includes various intelligent models and uses an underlying knowledge graph to identify learned correlations between sites, BoMs and between components. In the context of construction of cellular sites, for example, correlation between cellular sites and between direct and/or indirect characteristics of the sites (such as population density, geographical topology, demographics, operational performance, site services, and the like) may be learned using the intelligent models. The intelligent BoM builder is capable of intelligently selecting a site, creating a digital twin of the cellular site to be built based on an existing population of cellular sites, and generating a base BoM for the digital twin based on the correlations above and the BoMs of the existing population of cellular sites. The intelligent BoM builder further allows for and assists in modification of the automatically generated base BoMs by engineers (e.g., by intelligently recommending inclusion of additional components, exclusion of components, and/or replacement of components). The intelligent BoM builder may be configured as an integral part of the larger intelligent BoM advisor, as described in further detail below.

The intelligent BoM generation function is an integral part of an exemplary intelligent site construction process 100 is shown in FIG. 1. Specifically, FIG. 1 shows that the intelligent site construction process 100 may include the various steps below.

In step 102, a site construction project may be defined and initiated. In the context of cell site construction and for a telecommunication provider, the project objectives may be defined by a centralized team and various projects of constructing cell sites may be rolled out in either national or local scale. A site construction project definition may include various site information, including but not limited to radio resources, technology category (e.g., 4G, 4G LTE, or 4G), key component suppliers, and the like. A site construction project definition may further include geographic location, demographics, local economic characteristics, income levels, and the like. A site construction project may also define business objectives of the telecommunication provider. A particular site construction project may include a new cell site, or modification to existing cell site for improved services, such as lower packet loss, lower transmission latency, and higher data transmission bandwidth.

In step 104, a site-specific initial base BoM may be automatically generated. The initial BoM may include a list of components for the construction of the cell site. Detailed process steps for the automatic base BoM generation are described below in relation to FIG. 2.

In step 106, the initial base BoM may be further modified and adapted in an intelligent manner. In particular, the initial base BoM intelligently generated in step 104 may be passed on for engineering review. Different engineers may review the project objectives and perform modifications, including configuring for minor materials and components, as it applies to actual sites. The engineers determine whether modification of the initial BoM is needed according to project objectives for the individual site. The engineers may perform site visits and site walks to capture additional site metrics that may have implications on component properties (like cable length). Such information may be electronically fed back to the intelligent BoM builder and advisor. As shown in further detail below, the modification of the initial base BoM may be assisted by the intelligent BoM builder and advisory by providing recommended components to be added or as replacement of components in the initial base BoM via various learned correlations between BoM components and project objectives. The BoM modification step 106 may be implemented iteratively, as shown by the looping arrow 107.

In step 108, material or component scheduling may be generated indicating projected site construction timelines based on the availability and lead time of the components included in the BoM. The BoM may be further modified in view of the projected scheduling according to project scheduling objectives, as indicated by the looping arrow 109, to generate a final BoM, as shown in step 110. In step 112, the components listed in the final BoM may be provided to a supply chain. The components as listed in the BoM are then ordered and procured for site construction. Multiple BoMs may be generated, revised, and finalized at the same time, as multiple cell sites may be constructed. As such, the supply chain may further aggregate the multiple BoMs for component and material procurement.

Once the components and materials for a site construction is procured, the site may be then constructed and placed into operation. Maintenance information for various components may be recorded during the operation of the site. For a cell site, the telecommunication provider may gather performance data such as packet loss, latency, throughput, bandwidth, etc. of the cell site. These data are stored in a cell site performance database and help define future projects and assist in generating more suitable initial base BoM for future site constructions. Further, component maintenance records and information may be gathered and stored in a maintenance information database to facilitate automatic BoM generation for future site constructions, as shown in step 114 of FIG. 1. For example, components included in the constructed cell site may fail and be replaced. Such records reflect a reliability of a particular component and may be used by the intelligent BoM builder for selection of alternative components in automatic generation of BoM for future site constructions.

A data store in the form of a knowledge graph provides the intelligence to the implementation of the site construction process 100, as shown by 120 of FIG. 1. The knowledge graph provides data analytics and predictions underlying the intelligent BoM generation step 104, the BoM modification step 106, the material scheduling step 108, and the component/material maintenance step 14. The knowledge graph 120 and its underlying graphical database receive intermediate and final BoMs, site performance data, and component/maintenance records and information as shown by the various dashed arrows in FIG. 1. An example knowledge graph underlying the BoM builder and BoM advisor is described in more detail below in relation to FIG. 4.

Figure 2:
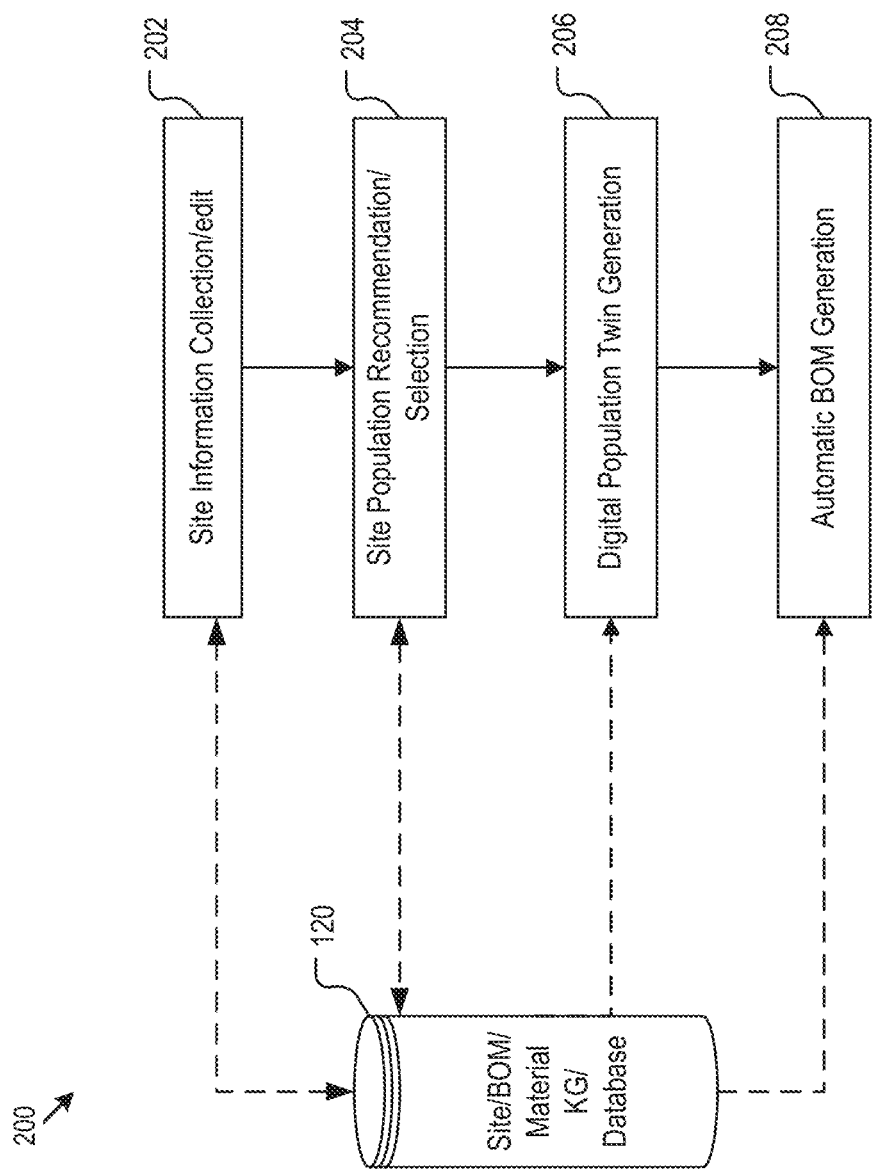
FIG. 2 illustrates an exemplary process and logic flow for an intelligent BoM generation to facilitate the intelligent site construction of FIG. 1.

FIG. 2 further illustrates an exemplary logic flow 200 for the initial site-specific base BoM generation step 104 of FIG. 1. One step of the logic flow 200 for the automatic BoM generation is shown as 206, in which a digital twin is created for the site as a digital representation (or replica) of the site. For example, for a cell site under construction, a digital population twin may be created. It is referred to as a "digital 'population' twin" because it is created as a digital representation based on a population of existing cell sites that collectively model the cell site to be constructed. In particular, because it is usually unlikely to find an existing cell site having exactly the same properties as the cell site to be constructed in all aspects (and thus its BoM may be simply reused), the cell site to be constructed may be more accurately represented by a digital model based on a collection of existing cell sites that are similar to the cell site to be constructed in various aspects. The terms "digital population twin" and "digital twin" are herein used interchangeably.

Referring again to the cellular network example, a subset of the existing cell site population in the knowledge graph 120 that are similar to the cell site to be constructed may be automatically selected by the intelligent BoM builder, as shown by 204 of FIG. 2, to generate the digital population twin in 206. The selection of the existing cell sites may be based on a matching between the various properties of the existing cell sites and project characteristics of the cell site to be constructed (alternatively referred to as site properties of the cell site to be constructed). These properties may be predefined and may be compared to indicate whether there are good matches using various data analysis including but not limited to converting these cell site properties into a multi-dimensional vector space or embedding space and then performing distance or similarity analysis between the converted vectors in the vector or embedding space. The intelligent BoM builder may determine whether two cell sites are similar by determining whether a distance between the two cell sites in the multi-dimensional vector space or embedding space is smaller than a predefined distance threshold. A set of better matched cell sites may be chosen by the intelligent BoM builder to function as the basis for the digital population twin of the cell site to be constructed.

As such, these properties for the site to be constructed may be first determined, collected, or edited, as shown in 202 of FIG. 2, before being fed to the site population recommendation/selection process 204. These site properties may be alternatively referred to as site information. The site properties or site information may be predetermined and may include various physical, technical, service, environmental, and other properties. For example, in the context of cellular network application, the cell site information may include information that is indicative of expected communication traffic at the cell site, including population density, number of mobile devices currently registered around the cell site, number of projected further mobile devices, demographics, number of households, average household income, and the like. The cell site information may include other information relating to electric signal environment of the cell site, including but not limited to geographic environmental characteristics (e.g., rural or urban, building density of heights), RF interferences, RF frequency resource availability, existing RF interferences, and the like.

In some implementations, the information above may be pre-stored and made available to the intelligent BoM builder. The intelligent BoM builder thus may automatically suggest a site. In the context of cellular network application, the intelligent BoM builder may automatically suggest a cell site to optimize the mobile network considering the locations and network properties of other existing cell sites or other cell sites being built and/or being planned. Various properties of the suggest site may be derived and used to establish the digital twin from a subset of suitable existing sites. In some implementations, the intelligent BoM builder may recommend multiple sites that may be considered for achieving communication goals of a particular construction project for user selection.

In some other implementations, the various properties for the site to be constructed may be made editable or adjustable by the user after an initial recommendation by the intelligent BoM builder. For example, in the context of cellular network application, the determination of the cell site population used for establishing the digital population twin of the cell site to be constructed in step 204 may be made by the intelligent BoM builder after such edit and adjustment.

Once the digital population twin is established for the site to be constructed, the intelligent BoM builder, in step 208 of FIG. 2, may proceed to automatically generate an initial base BoM based on the BoMs and other information associated with the selected population of existing sites within the digital population twin of the site to be constructed.

Figure 3:
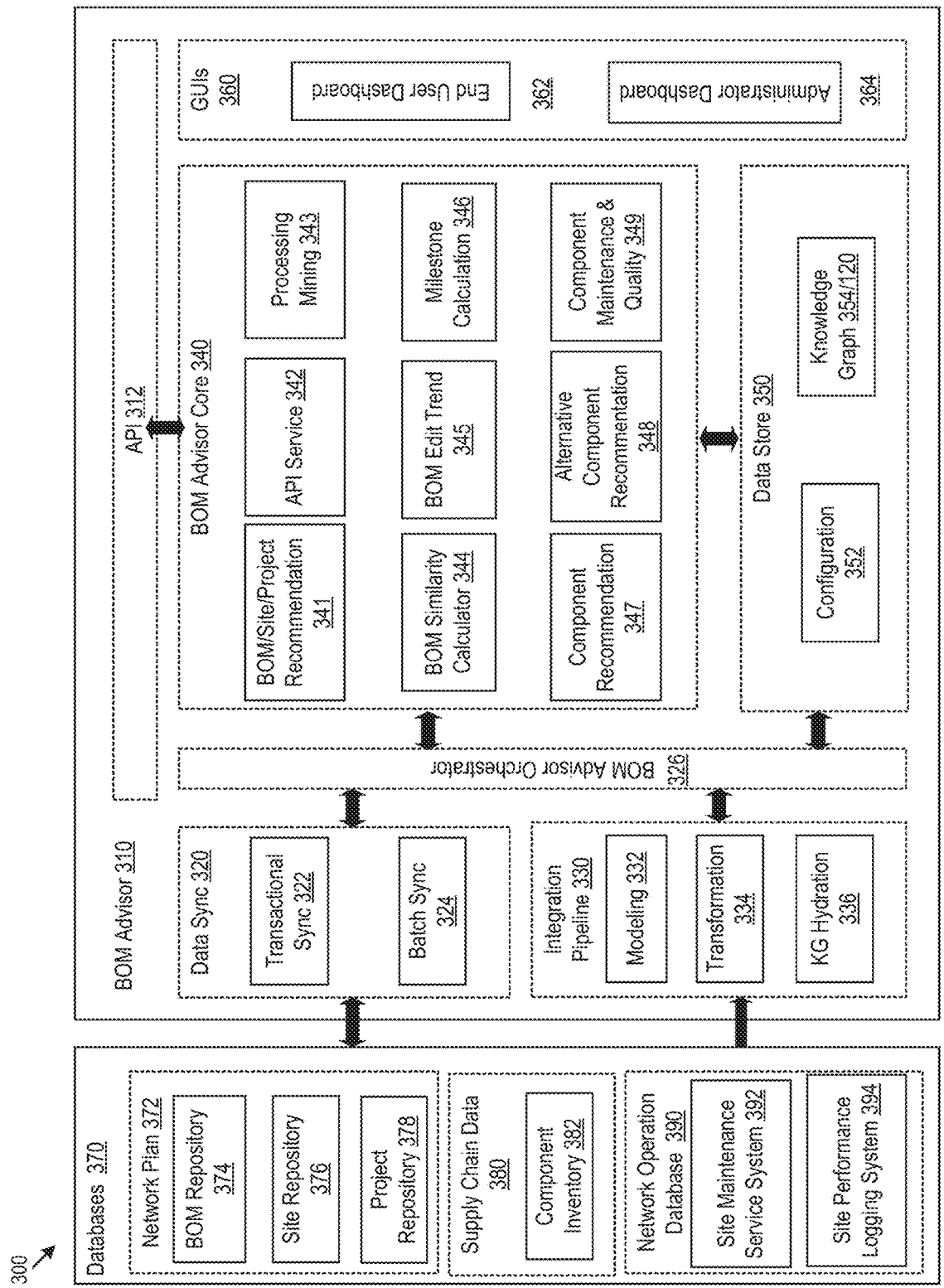
FIG. 3 illustrates an exemplary functional block diagram of an intelligent BoM advisor.

FIG. 3 illustrates a functional block diagram 300 for an exemplary intelligent BoM system including a BoM advisor 310 in communication with database 370. The BoM advisor 310 may include a BoM advisor core 340 (alternatively referred as the core for simplicity), a data store 350, a data synchronization circuitry 320, a data integration pipeline 330, and a BoM advisor orchestrator 326 (alternatively referred to as an orchestrator) that functions as a coordinator between the core 340, the data store 350, the data synchronization circuitry 320, and the data integration pipeline 330. The BoM advisor 310 further includes various graphical user interfaces (GUIs) 360 to enable control of the operation of the BoM advisor 310, including, for example, an end user dashboard 362 and an administrator dashboard 364.

The various functionalities of the intelligent BoM advisor 310 may reside in the core 340 and implemented as a set of processing modules. Lower level functions may be included in a function library and provided to the core 340 via an Application Programming Interface (API) 312. The core 340, for example, may include:

- a BoM/Site/Project recommendation engine 341 for automatic site selection, generation of a digital population twin and base BoM recommendation;
- a BoM similarity calculator engine 344 configured to compare BoMs to qualify or quantify their similarities;
- a BoM edit trend monitor 345 for monitoring manual edits made by users on top of recommended BoMs and supplying the monitored trend to other modules of the BoM advisor 310 for improving future BoM/site recommendations;
- a component recommendation module 347 for identifying various components for a BoM;
- an alternative component recommendation module 348 for identifying replacement components in view of, for example, cost-lead time trade-offs or reliability.
- a component maintenance and quality control module 349 for coordinating maintenance and replacement of components, generating reliability data, recording and providing maintenance and replacement record and component reliability information to other modules of the BoM advisor 310 for improving future BoM recommendation in consideration of component reliability;
- a processing mining module 343 configured to mine the BoM data to extract the ordering of processes from the larger set of data, to measure percentage transitions between states of components, and to model the average process and deviations between states of components. Additionally the process mining module 343 may also take any given BoM to extract its process as provided or embedded in the data for a given BoM and maps the chosen materials against that process. It returns a report on whether certain components will meet process requirements or not by analyzing delivery dates of the components against the construction dates. Additionally the processing mining module 343 maps the process of a particular BoM against a sample of BoM processes chosen in the beginning of the application to see how much this process deviates from distribution of processes that have occurred in the past, thereby providing a metric of conformity to what has historically been seen with regard to transitions to states of components, duration of the transitions, and duration of states of the components. This is apart from the analysis provided to the end user at the completion of the BoM building.
- a project milestone calculation engine 346 to take a current BoM and gives the user an insight on how the materials in the BoM affects the milestone timeline for the project. It uses information about the materials currently in inventory, the lead-times specified by the supplier, the historical delivery lead-times, and the reliability of the supplier to deliver on time as parameters to calculate risks that materials poses to the milestones timeline, and potential delay of construction time; and
- an API service module 342 for managing the use of the API 312 within the BoM advisor core 340.

The data store 350 may keep track of various configurations 352 for the BoM advisor 310 and further include the knowledge graph 354. The knowledge graph 354 keeps track of known data relationships and predicts hidden data relationships to provide the BoM advisor 310 with intelligence in site selection, digital population twin generation, BoM similarity determination, BoM recommendation, and component maintenance. An exemplary schema for the knowledge graph 354 is described in further detail below in relation to FIG. 4.

Other data that are consumed by the BoM advisor 310 may be provided from various separate data sources or databases 370. For example, in the context of cellular network application, data associated with the mobile network may be used to facilitate the functionalities of the BoM advisor 310, including but not limited to network plan repositories 372 and network operation database 390. The network plan repositories 372, for example, may include a repository for BoMs for existing cell sites, a repository for cell sites information, and a repository for cell site construction projects. The network operation database 390, for example, may include data generated by a cell site maintenance service system 392 and cell site performance logging data 394. The databases 370 may further include supply chain data 380 for providing data that may affect how components are recommended and selected by the BoM advisor 310. The supply chain data from the supply chain data 380, for example, may include a component inventory 382.

The various data above may be synchronized by the data synchronization circuitry 320 and integrated by the data integration pipeline 330, and then processed by the BoM advisor orchestrator 326 before being provided to the various modules and/or engines of the BoM advisor core 340 for consumption. The data synchronization circuitry 320 may be responsible for keeping track of data time stamps and providing data to the BoM advisor core 340 with data that are relevant at each particular time point or particular time duration, including, for example, a transactional synchronization circuitry 322 and a batch synchronization circuitry 324. The data integration pipeline 330, for example, may include various data models 332, data transformers 334, and hydration modules 336 for the knowledge graph 354.

In view of the functional block diagram 300 of FIG. 3, a more detailed description of the intelligent BoM creation and modification, and component maintenance process within the logic flows of FIGS. 1 and 2 are provided below as the following processes:

1) A BoM advisor knowledge ingestion pipeline allows for building entities, relationships and inference from a variety of data sources (such as, for example, historical BoMs 374 and site features from site repository 376, supply chain data 380 including component inventory 382, and site maintenance operation data 392 and site performance data 394) that may be processed by the data synchronization circuitry 320 and the data integration pipeline 330 to generate the knowledge graph 354, which serves as the source of intelligence applied during the BoM building process and component maintenance process.

2) During the BoM building process, the BoM Advisor 310 analyzes the site location properties and project objectives and targets (e.g., cost and timeline) of the site for which the BoM is being built to create, for example a vectorized representation of these properties, objectives and targets in a multi-dimensional vector or embedding space (using, e.g., the data integration pipeline 330 of FIG. 3) for further calculation and processing.

3) The BoM Advisor core 340 performs a BoM recommendation by taking the vectorized representation of the site location properties, project objectives and targets as input, and querying the knowledge graph 354 for a collection of historical BoM with vectorized properties in the vector or embedding space that best matches the input vector using similarity algorithms (e.g., closeness in distance between the vectors in the vector or embedding space). The BoM advisor 310 presents the selection of BoMs to the user for verification via the end user dashboard 362 of the GUIs 360, allowing the user to confirm and further select the BoMs the user believes best fit the planned site. The components recommended for the confirmed population of historical BoMs are retrieved. The digital population twin of the planned site is generated based on the selected population of historical sites.

4) The generation of recommended base BoM includes retrieval of components for the confirmed historical BoM population (according to, e.g., component popularity), deduplication and quantity verification of the components using the BoM/Site/Project recommendation engine 341. The recommended BoM for the digital population twin of the planned site is then presented to the user via the end user dashboard 362 of the GUIs 360.

5) The base BoM for the digital population twin of the planned site may be subject to edit and component substitution by the user via the end user dashboard 362 of the GUIs 360. The component recommendation module 347 and the alternative component recommendation module 348 may assist in the user editing and component replacement process. The recommendation may be based on historical BoM and component defect and maintenance history as stored in the knowledge graph 354. For example, a replacement component recommendation may be based on relationship between like components nodes in the Knowledge graph. For another example, components recommended to be added may be based on co-occurrence of a component with other components. In addition, the BoM advisor 310 may provide the user with reason for recommendation of additional or replacement components (e.g., prior reliability issue as indicated in the knowledge graph 354 or long lead time as indicated from the supply chain data 380 for a component recommended to be replaced). As such, a more adaptive, reliable, higher quality, and complete BoM is generated based on the initially recommended base BoM from the digital population twin of the planned site.

6) The project milestone calculation engine 346 takes the current BoM generated and modified above and gives the user via the end user dashboard 362 an insight into how the components in the BoM affect a milestone timeline for the construction of the site. It analyzes the type of project (obtained from the project repository 378), the components currently in inventory (from the supply chain component inventory 380), the delivery lead-times specified by the supplier, the historical delivery lead-times, and the reliability of the supplier to deliver on time (as part of the supply chain data 380 not shown in FIG. 3) as parameters to calculate risks that the components pose to the milestones timeline, and potential delay of construction time. The user may be provided with a view of the milestones and risk information via the end user dashboard 362 and opportunity to further iteratively edit and modify components in the BoM to effectuate a more desired set of milestones and lower risk.

6) The finalized components created with the BoM Advisor 310 flows back to the current BoM building process for procurement, site build, etc.

7) The operation and maintenance of the sites after constructions are monitored by the BoM advisor 310 and recorded in a database, such as the network operation database 390, and/or the knowledge graph 354 to reflect, for example, the reliability of the various components, which, as described above, provides one of the various considerations in the recommendation of components and generation of BoMs above.

Figure 4:
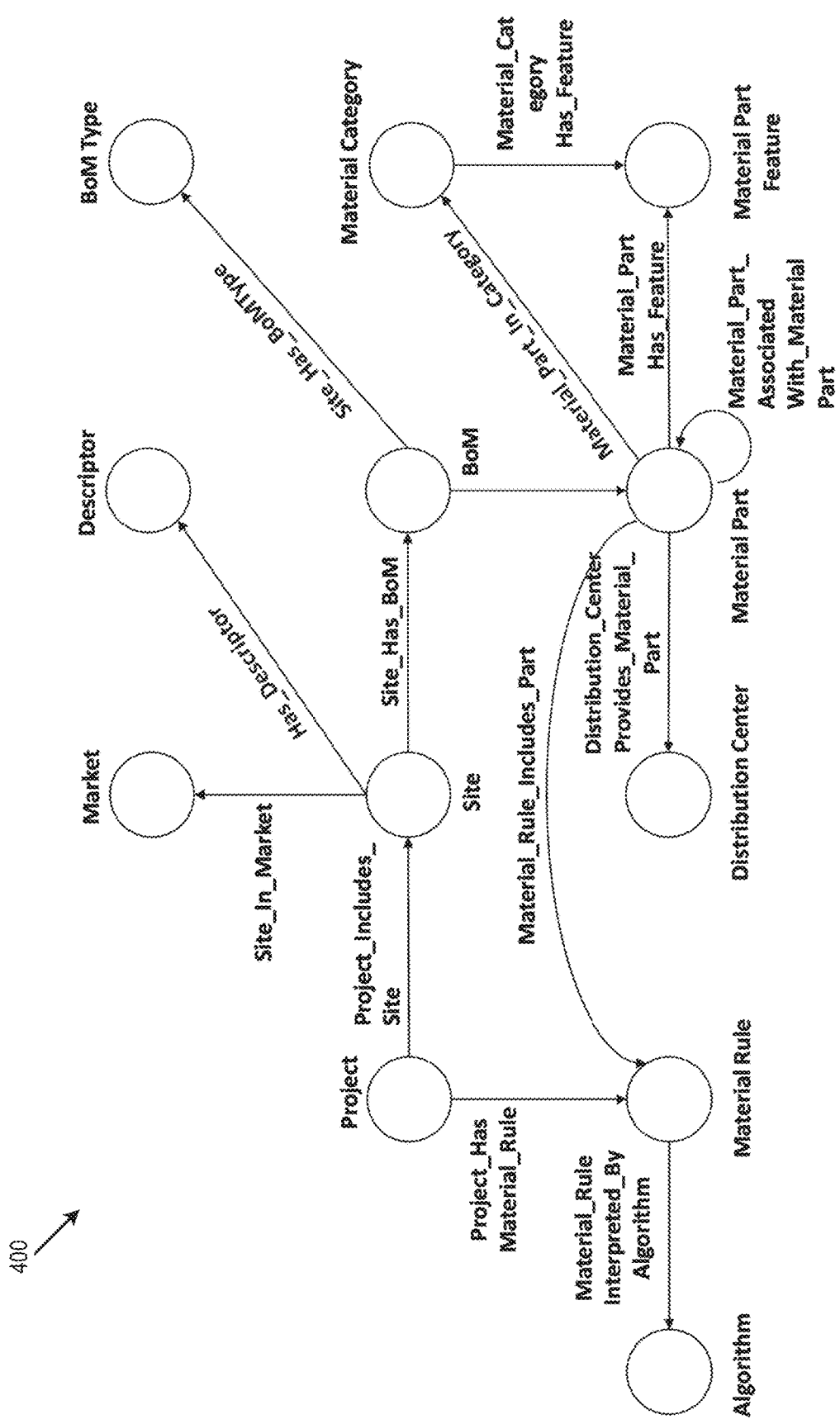
FIG. 4 illustrates an exemplary schema for a knowledge graph underlying the intelligent BoM advisor of FIG. 3 and the intelligent site construction process and logic flow of FIG. 1.

The knowledge graph 354 of FIG. 3 in the BoM advisor 310 provides the predictive intelligence in BoM/component recommendation and site maintenance. FIG. 4 illustrates an exemplary schema 400 for an underlying graphical database for the knowledge graph 354 of FIG. 3 (or 120 of FIG. 1). The exemplary schema 400 includes various types of nodes and types of edges between the nodes. An actual graphical database underlying the knowledge graph 354 may be materialized (populated with actual entity nodes and relationship edges) based on the schema 400. Various prediction models may then be trained based on the materialized graphical database, and together with the materialized graphical database, form the knowledge graph 354. The knowledge graph 357 may then be used for query and for generating prediction of, for example, unknown or hidden correlation or relationship between specific nodes.

The knowledge graph 354 includes nodes representing various entities and directional edges representing relationship between the entities, as reflected in the exemplary schema 400 of FIG. 4. FIG. 4 shows various node types such as "project" type, "site" type, "BoM" type, "material part" (component) type, and the like. FIG. 4 further shows general types of directional relationships between these various types of nodes. The schema 400 of FIG. 4 forms the bases for materializing the graphical database underlying the knowledge graph 354. Entries to the underlying graphical database may be composed in various different forms, depending on the type of graphical database framework being used.

For example, in a Labeled Property Graph (LPG) framework, the graphical database may include various materialized nodes (or vertices) and edges, and both nodes and edges may have internal data structures in an LPG framework. For example, a node may include various characteristics of the corresponding entity including its type and its various properties. Likewise, an edge may include characteristics such as its type and a pair of types of entities it connects to. Entries to an LPG database may be made in the form of triples of (entity, relationship, entity) to specify particular link between entities. For another example, in a Resource Description Framework (RDF) system framework, while entities and relationships may be respectively represented by nodes/vertices and edges. These nodes/vertices and edges, unlike in the LPG framework, may each be identified by a Unique Resource Identifier (URI) as a pure label and thus may not have any internal structures. In some specific implementations, the graphical database and knowledge graph 354 may be generated using LPG in TigerGraph, Gremlin, or Neo4j platforms.

Correlation between entities in the materialized graphical database above may be identified. For example, correlations between components (of the "material part" type in the schema 400 of FIG. 4) may be identified and used as replacement to one another. Such relationship between particular components may be extracted learned through relationship pattern between these components and various BoM entities (of the "BoM" type in FIG. 4) of various related sites (of the "site" type in FIG. 4) that may be similar in their descriptor (of "descriptor type in FIG. 4), market (of "market" type in FIG. 4), and/or other properties not shown in FIG. 4.

Correlations between components and other entities in the graphical database above may be identified using multi-hop inference. Such inference may be used to identify, e.g., similar components as replacement recommendations. In particular, a description of each of the components (both major and minor components) stored in the graphical database may be processed. For example, punctuation and spurious whitespace may be removed (e.g., commas, tabs, etc. or some regular expression matching are removed if they are of less use in determining correlations between descriptions). For another example, jargons or abbreviations may be normalized (e.g. "crd" becomes "card") and stop words (e.g. "is", "a", "the" and so on) may be removed. For example, an original description of a component may be "(XCR-FO-CSRSFP) FO, XCVR, CSR ONLY SFP, CSCO=". After removing punctuation and white space as well as any key character sequence patterns, the description becomes "FO XCVR CSR ONLY SFP CSCO". After further jargon and abbreviation normalization, the description becomes "Fixed_Output Transceiver Cell_Switched_Router ONLY Small_Form_Factor_Pluggable Cisco". After stop work remove, the description finally becomes (Fixed_Output Transceiver Cell_Switched_Router Small_Form_Factor_Pluggable Cisco).

Such remaining component description information may then be tokenized into a list of words that become concepts or features for this unique component. In the knowledge graph, the part number for the component may be used to identify a component node. An edge between each of the concepts or word features from the tokenized description of the component extracted above may be created and stored in the graphical database. All components may be processed this way and some components may have similar concepts or word features (e.g. word features of Cisco or Transceiver, etc. may be shared by different components). To identify a similar component of a source component, a query may be created to travel down from a word feature edge of the source component node to another component. These components are connected by that common word feature, or via two hops in the graphical database. The components with the highest count of common features with a source component as obtained from that two-hop inference may be recommended as replace components. In some implementations, categories (classes of components) may be assigned to components and identifying similar components may be made via four-hop inferences between features of categories to get related classes of components.

Turning back to the graphical database schema of FIG. 4, as new information (e.g., new BoMs from newly constructed sites, or new maintenance records) is fed to the graphical database underlying the knowledge graph 354, the various query and predictive models associated with the knowledge graph 354 may be retrained and updated for improving the query and prediction accuracy of BoM and component recommendation for future sites.

FIGS. 5-14 below show various exemplary GUIs 360 of FIG. 3 provided by the intelligent BOM advisor 310 to facilitate the site selection, component recommendation, digital population twin generation, BoM regeneration/recommendation/modification, and site construction timeline analysis. The examples are given in the context of cellular network application.

Figure 5:
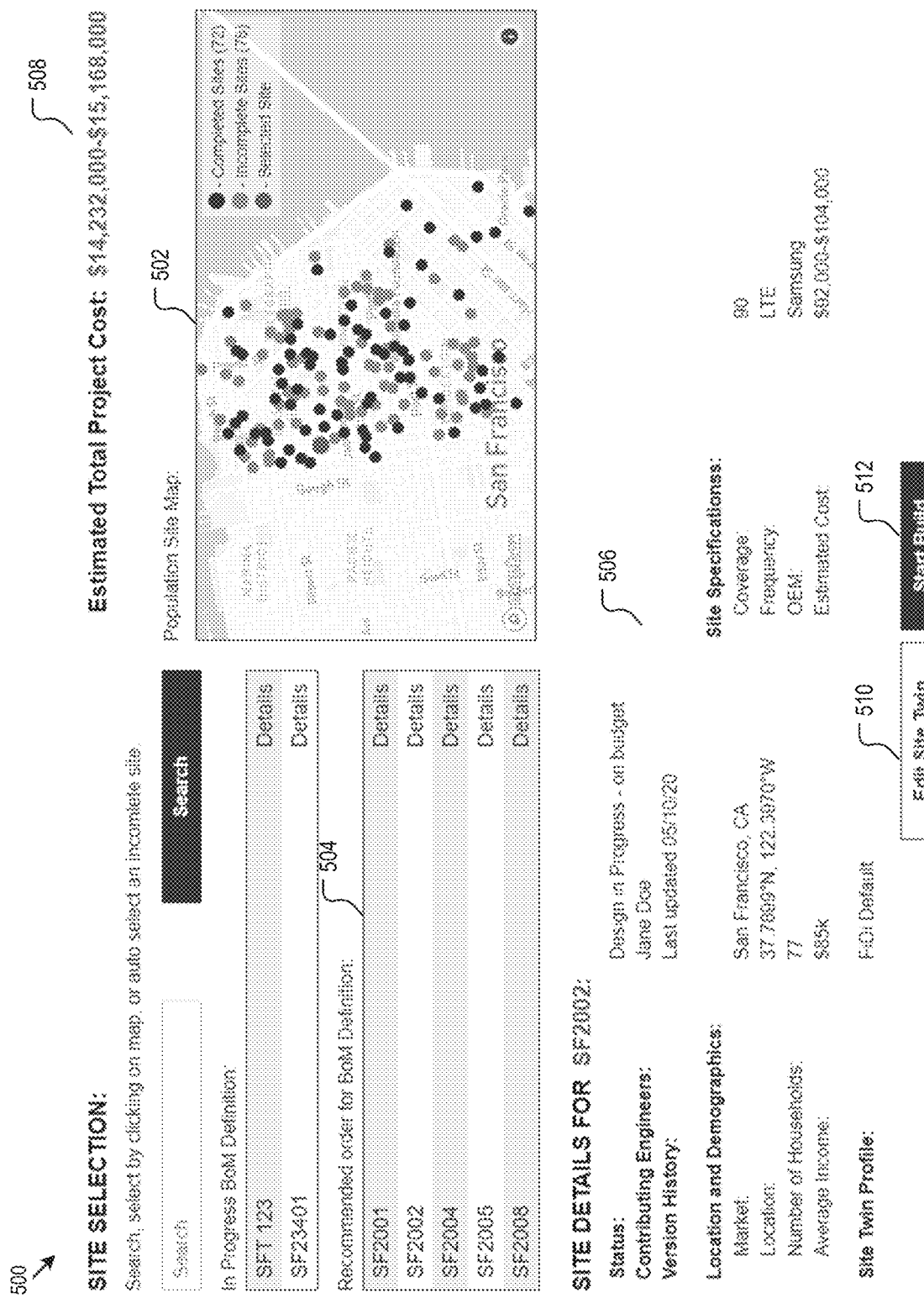
FIG. 5 shows an exemplary user interface of the BoM advisor of FIG. 3 for site selection for construction.

For example, FIG. 5 shows a user interface 500 for cell site selection. In particular, the user interface 500 shows various cell sites in a cell site map 502 that are completed and/or are being constructed in a particular geographical area in a form of, e.g., a site map. The user interface 500 further provides recommendations for new cell sites based on service needs and service capability of existing cell sites, as shown by 504. Each of the items in 504 may represent a recommended digital population twin for a cell site. Each of these recommendations may be selectable and the corresponding cell site may be displayed in the site map 502. More details for a selected recommendation may also be shown in a digital population twin information panel 506 including site status information, location, demographics, and site service specification. In some implementations, an estimated project cost for the selected recommendation from 504 may be further shown, as indicated by 508. The user may either proceed to modifying the recommended and selected digital population twin by activating button 510 or proceed to BoM building by activating button 512.

Figure 6:
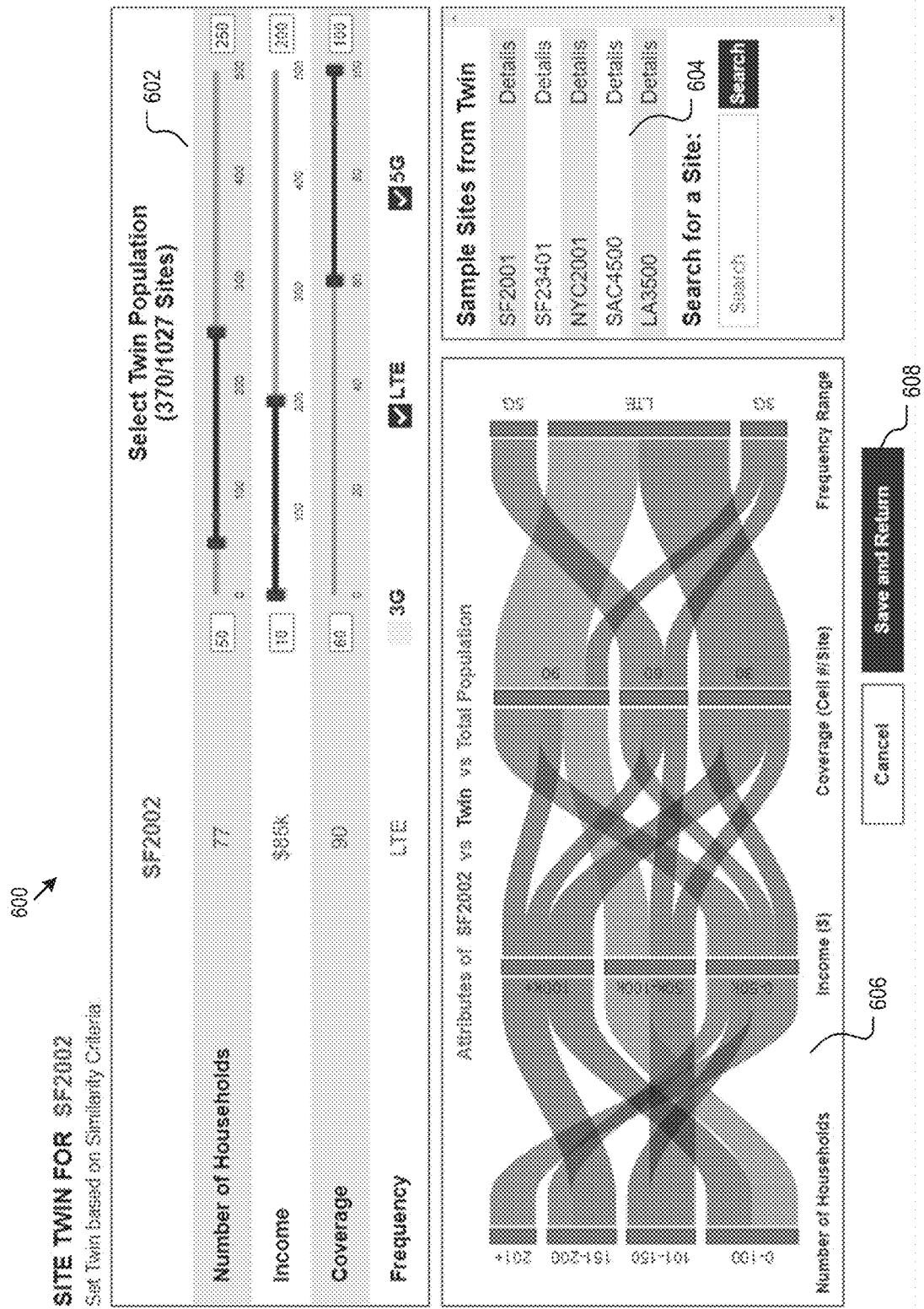
FIG. 6 shows an exemplary user interface for the BoM advisor of FIG. 3 for editing and modifying information for a digital twin of the site selected for construction in FIG. 5.

By activating the button 510 of FIG. 5, a site twin editing interface 600 of FIG. 6 may be invoked. The site twin editing interface 600 allows the user to modify various site information (e.g., number of households, income level, number of mobile devices supported or coverage, and radio frequency bands), as shown by 602. The terms site twin, digital twin, and digital population twin are used interchangeably. The user may decide to modify these site parameters for various reasons. For example, the user many anticipate that these parameters as recommended by the intelligent BoM advisor will change in the near future and such changes have not been predicted by the intelligent BoM advisor when recommending the digital population twin. The site twin editing interface 600 may further show a list of cell sites 604 that are selected by the intelligent BoM advisor to form the group of cell sites as the basis for the digital population twin for the cell site to be constructed. In some implementations, the site twin information as recommended or as modified by the user may be shown graphically against each of the population cell sites associated with the site twin, as indicated by 606. The Site twin as modified by the user may then be used as the actual digital population twin for BoM building, as indicated by button 608.

Figure 7:
FIG. 7 shows an exemplary user interface for the BoM advisor of FIG. 3 for displaying information of an existing site belonging to a group of sites used for generating the digital twin of FIG. 6.

FIG. 7 shows an exemplary user interface 700 for BoM building for the cell site to be constructed based on the recommendation of site twin by the BoM advisor as modified by the user. The exemplary user interface 700 may be used to show a list of base BoMs as recommended by the BoM advisor by using option 702, or currently as-is BoM by using option 704, or difference between the two previous BoMs by using option 706. The BoM list may be shown in panel 710 together with site summary information 712.

Figure 8:
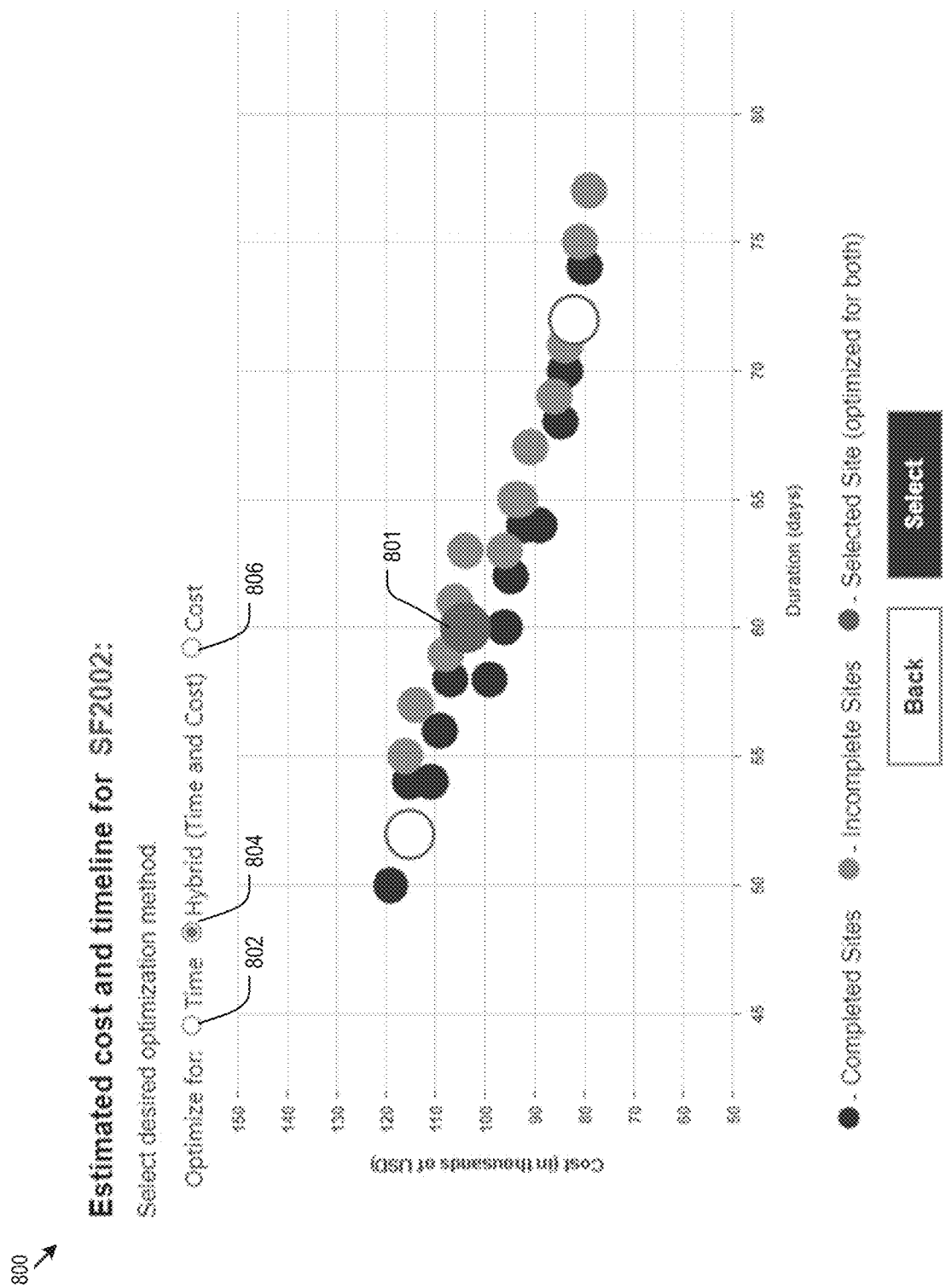
FIG. 8 shows an exemplary user interface for the BoM advisor of FIG. 3 for displaying a cost and construction time mapping of existing sites and the site selected for construction.

FIG. 8 shows an exemplary user interface 800 to display estimated cost and construction time 801 of the cell site using a current BoM as recommended by the BoM advisor or as modified by the user against other existing cell sites and/or other cell sites being constructed (circles in FIG. 8 other than 802). As shown by 802, 804, and 806, the exemplary interface 800 further provides options to perform further BoM optimization based on time for construction, cost of construction, or hybrid of time and cost. The optimization involves adjusting the components in the BoM according to the selected optimization mode.

Figure 9:
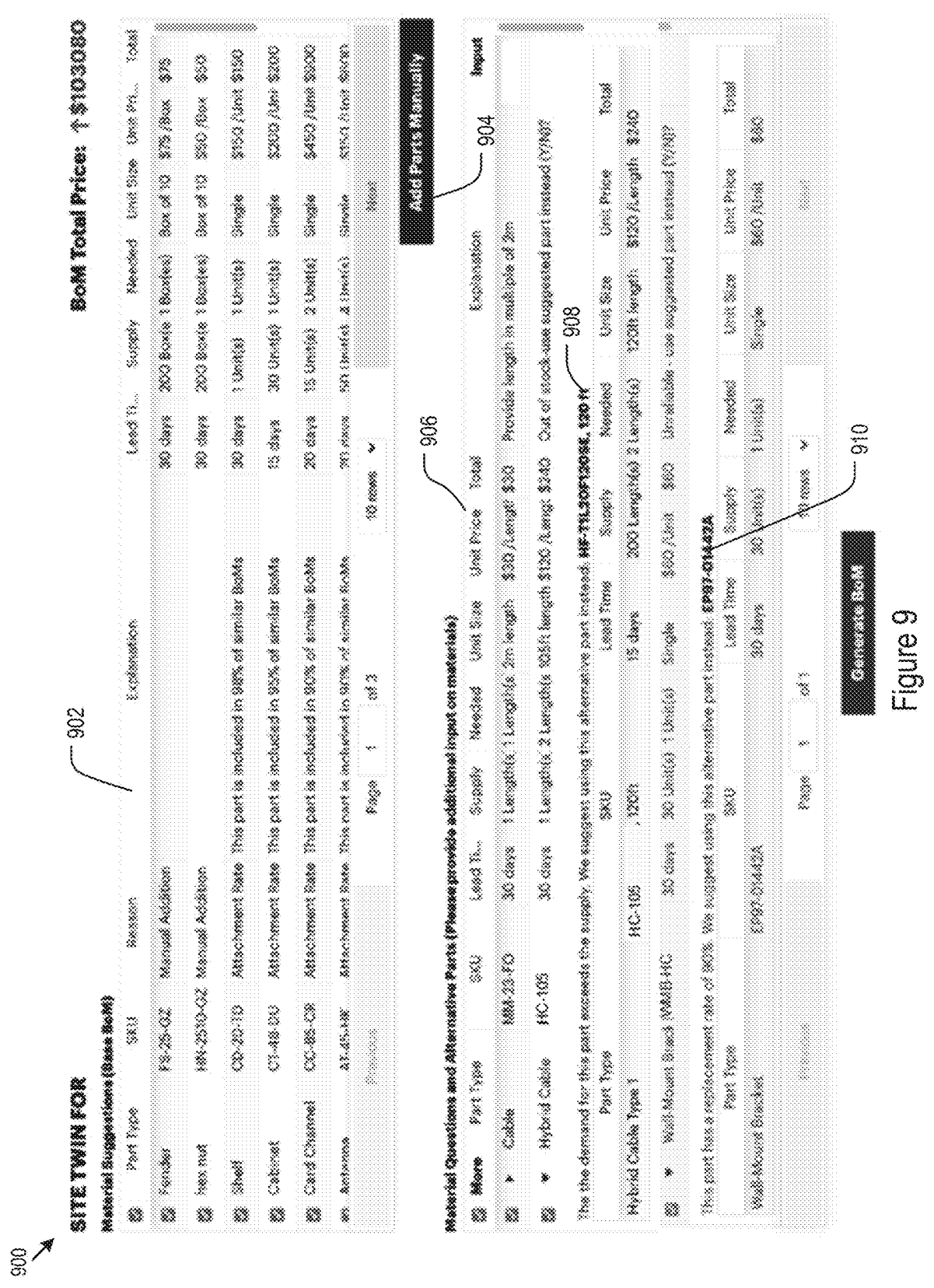

FIG. 9 shows an exemplary user interface 900 for displaying full base BoM 902 as optimized in FIG. 8. An option may be provided for the user to further add, remove, or replace components in the base BoM 902. For example, the user may add components to the base BoM 902 using button 904. Activation of the button 904 may trigger display of panel 906, which shows a list of components that the user may choose to add to the BoM. Further information related to these components may be shown. For example, important information such as cable length 908 may be provided (as splicing of cables having incorrect lengths my cause much delay and cost overhead during construction of the cell site). For another example, reliability information extracted from the maintenance records described above may be shown for one or more components to assist component selection by the user, as indicated by 910.

Figure 10:
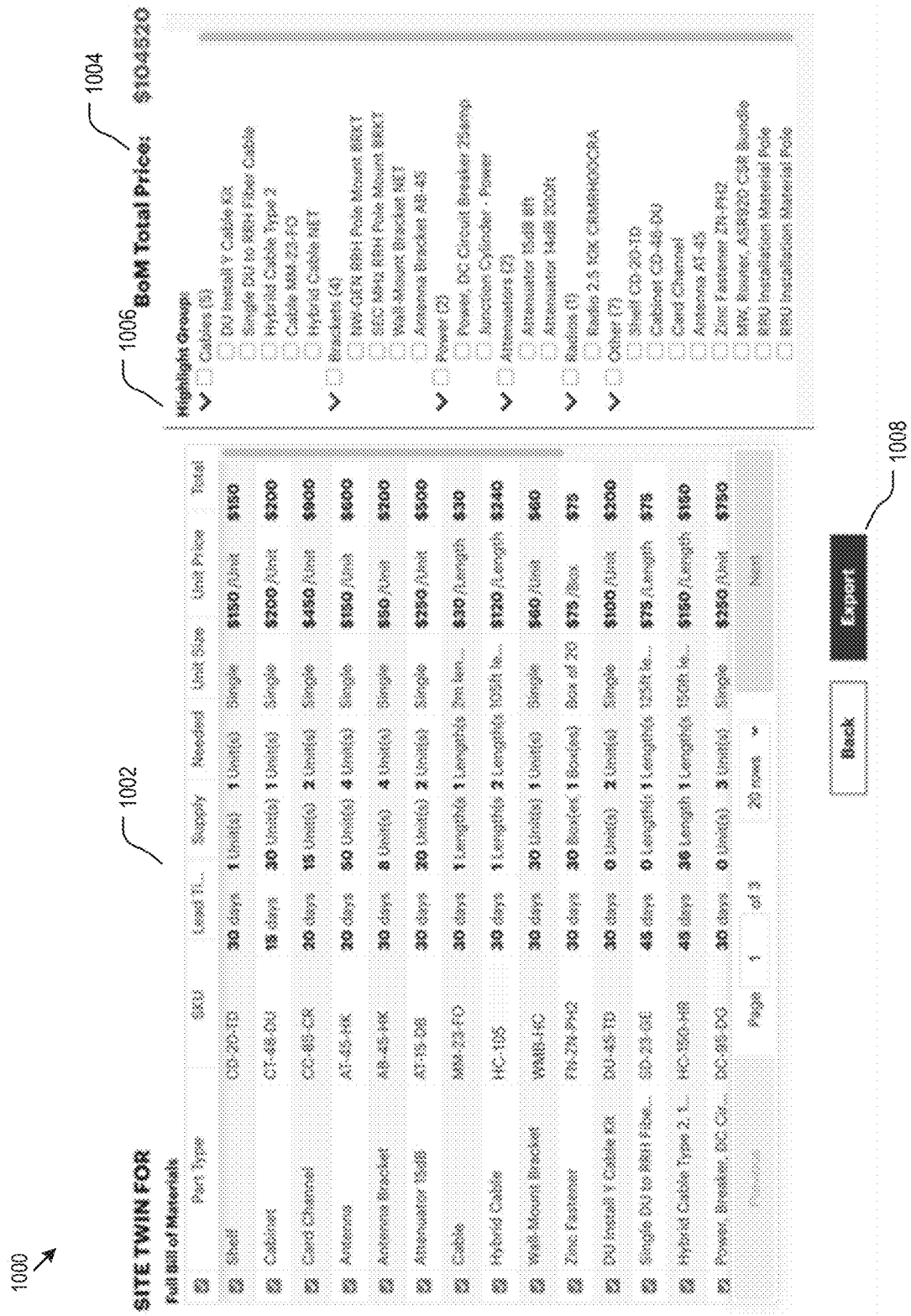
FIG. 10 shows an exemplary user interface for the BoM advisor of FIG. 3 for displaying a BoM generated for the digital twin of FIG. 6.

FIG. 10 shows an exemplary user interface 1000 for displaying a final BoM list 1002 with BoM price 1004 and a BoM highlight category selector 1006. The BoM highlight selector may be used to only show components of selected categories and hide the rest of the components in BoM list 1002. The user may proceed to finalizing and exporting the BoM by activating button 1008.

Figure 11:
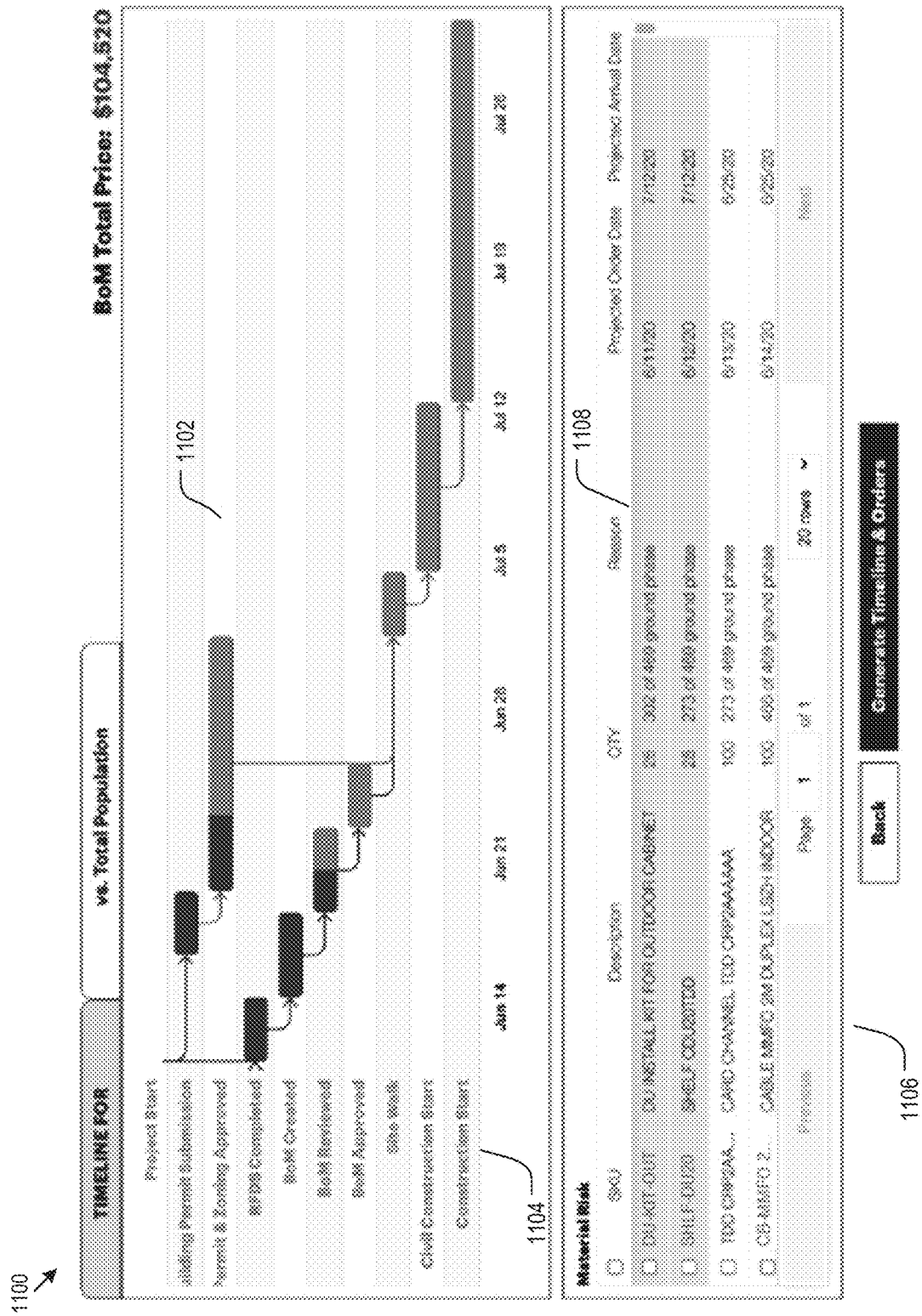
FIG. 11 shows exemplary user interface for the BoM advisor of FIG. 3 for displaying a site construction timeline based on the BoM generated in FIG. 10.

FIG. 11 depicts an exemplary user interface 1100 showing a scheduling analysis for the cell site construction. The exemplary user interface 1100 may depict one or two timelines 1102 for the projects with respect to various milestones 1104, and dependency among the milestones. The exemplary interface 1100 may be further configured to show a list of components 1106 that are critical to the timelines 1102 and thus represent risks to the project. The displayed information may include, among others, reasons for the risks 1108.

Figure 12:
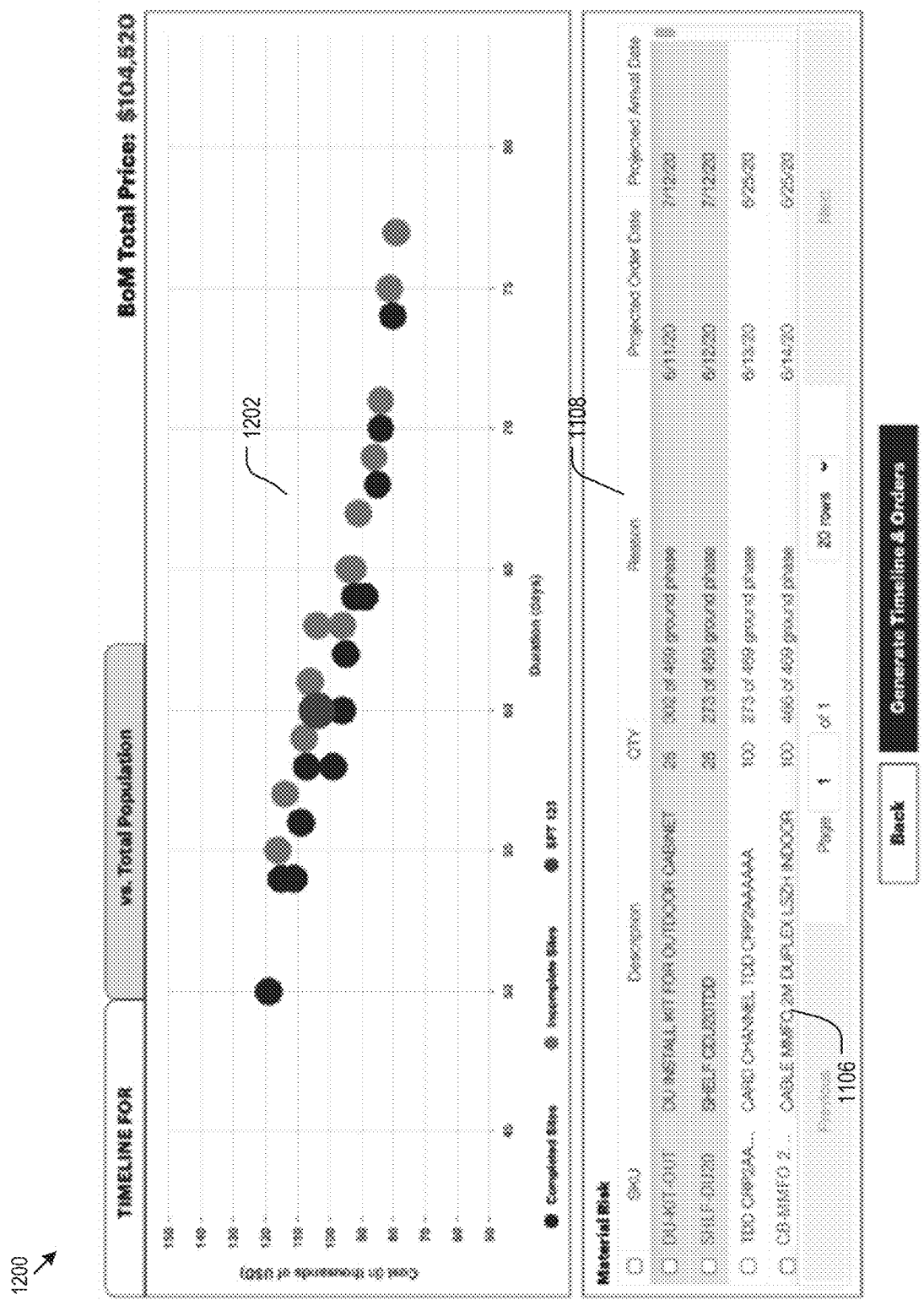
FIG. 12 shows an exemplary user interface for the BoM advisor of FIG. 3 for displaying a time and construction time mapping of a site to be constructed and existing site based on the BoM of FIG. 10.

FIG. 12 depicts an exemplary user interface 1200 showing a cost-construction time analysis 1202 for the cell site construction compared with other completed or in-progress cell sites. The exemplary user interface 1200 may further show a list of components 1106 that are critical to the timelines 1102 and thus represent risks to the project, similar to the exemplary user interface 1100 of FIG. 11.

Figure 13:
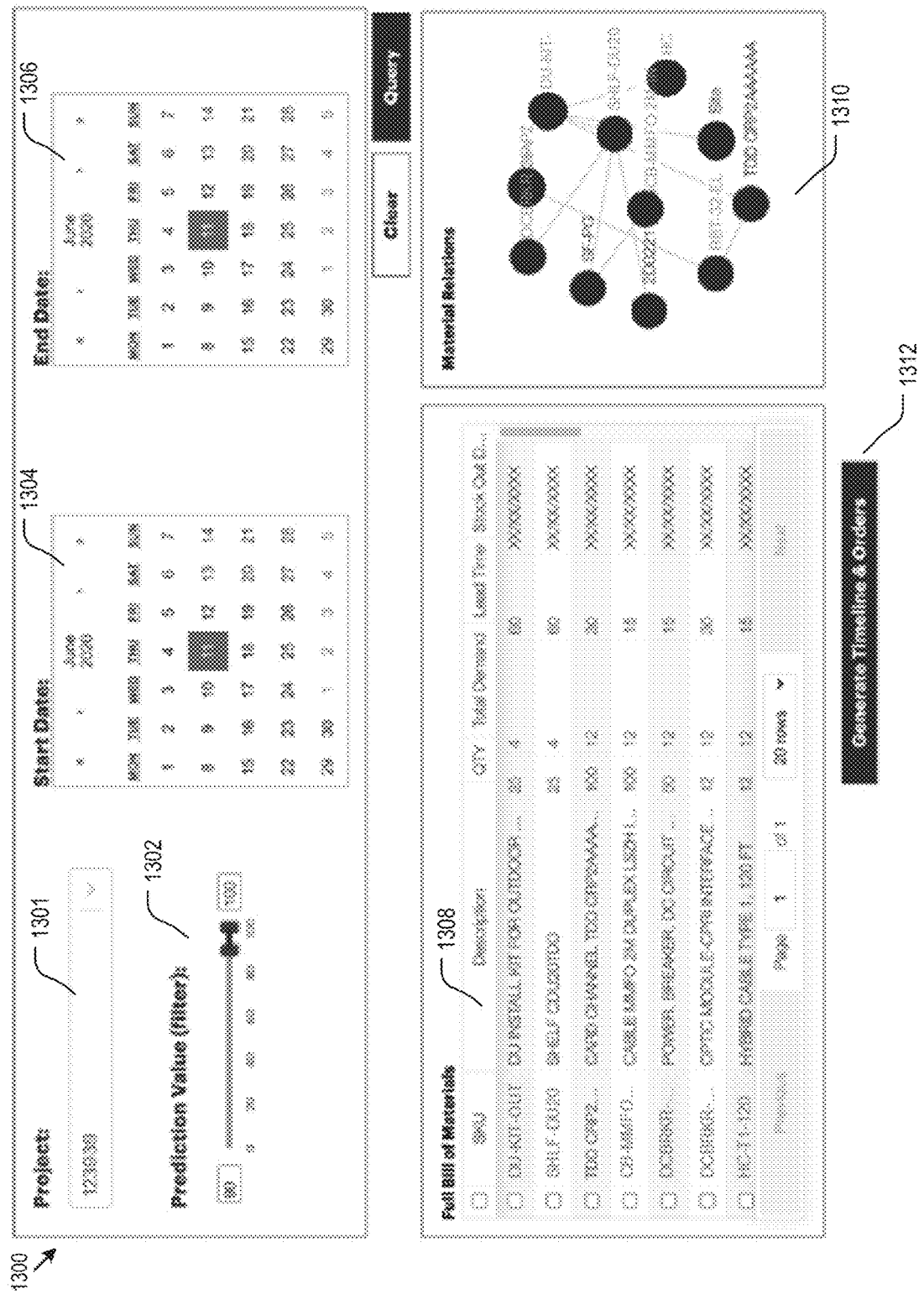
FIG. 13 shows an exemplary user interface for the BoM Advisor of FIG. 3 for searching and viewing site constructions by project schedule.

FIG. 13 depicts an exemplary user interface 1300 for selecting a cell site project for generating a component order and project timelines. A shown in FIG. 13, a cell site project can be selected/searched/filtered according to project name 1301, value 1302, project start time 1304 and/or end time 1306. The full BoM of the selected project may be shown in 1308, with component relationship shown graphically in 1310. Activation of button 1312 may trigger placement of orders for the components and generation of the project timeline.

Figure 14:
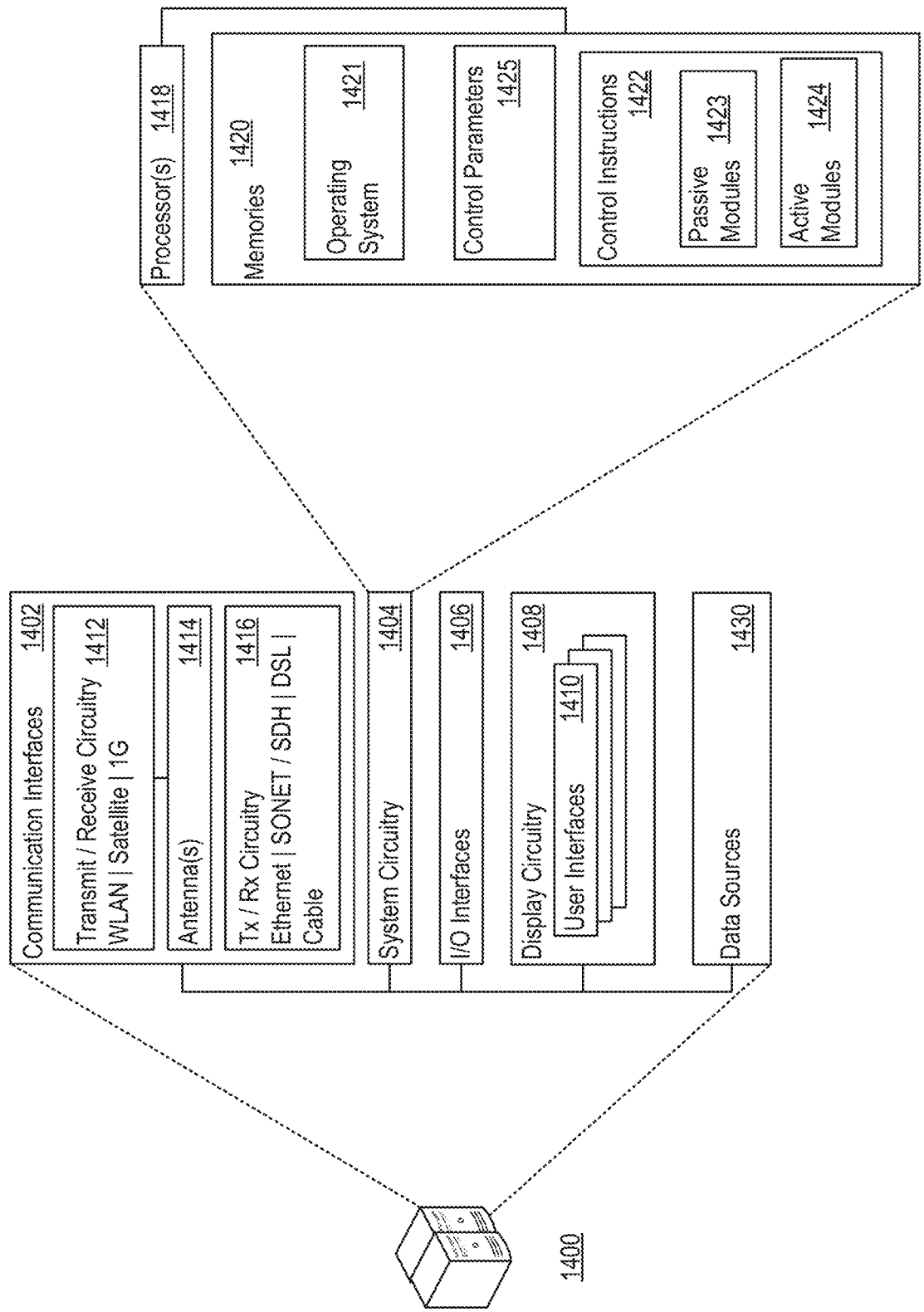
FIG. 14 illustrates an exemplary computer system that may form part of or implement the systems described in the figures above or in the following disclosure.

Finally, FIG. 14 illustrates an exemplary computer architecture of a computer device 1400 on which the features of the BoM Advisor and its various functional modules are implemented. The computer device 1400 includes communication interfaces 1402, system circuitry 1404, input/output (I/O) interface circuitry 1406, and display circuitry 1408. The graphical user interfaces (GUIs) 1410 displayed by the display circuitry 1408 may be representative of GUIs generated by the BoM Advisor and its various components to, for example, receive user commands/input and to display various outputs, as discussed above. The GUIs 1410 may be displayed locally using the display circuitry 1408, or for remote visualization, e.g., as HTML, JavaScript, audio, and video output for a web browser running on a local or remote machine. Among other interface features, the GUIs 1410 may further render displays of visual representations of, for example, the projected bill of materials such as the illustrations shown in FIG. 5, the schedule analysis as shown in FIG. 6, above.

The GUIs 1410 and the I/O interface circuitry 1406 may include touch sensitive displays, voice or facial recognition inputs, buttons, switches, speakers and other user interface elements. Additional examples of the I/O interface circuitry 1406 includes microphones, video and still image cameras, headset and microphone input/output jacks, Universal Serial Bus (USB) connectors, memory card slots, and other types of inputs. The I/O interface circuitry 1406 may further include magnetic or optical media interfaces (e.g., a CDROM or DVD drive), serial and parallel bus interfaces, and keyboard and mouse interfaces.

The communication interfaces 1402 may include wireless transmitters and receivers ("transceivers") 1412 and any antennas 1414 used by the transmit and receive circuitry of the transceivers 1412. The transceivers 1412 and antennas 1414 may support WiFi network communications, for instance, under any version of IEEE 802.11, e.g., 802.11n or 802.11ac, or other wireless protocols such as Bluetooth, Wi-Fi, WLAN, cellular (4G, LTE/A). The communication interfaces 1402 may also include serial interfaces, such as universal serial bus (USB), serial ATA, IEEE 1394, lighting port, $I^2C$, slimBus, or other serial interfaces. The communication interfaces 1402 may also include wireline transceivers 1416 to support wired communication protocols. The wireline transceivers 1416 may provide physical layer interfaces for any of a wide range of communication protocols, such as any type of Ethernet, Gigabit Ethernet, optical networking protocols, data over cable service interface specification (DOCSIS), digital subscriber line (DSL), Synchronous Optical Network (SONET), or other protocol.

The system circuitry 1404 may include any combination of hardware, software, firmware, APIs, and/or other circuitry. The system circuitry 1404 may be implemented, for example, with one or more systems on a chip (SoC), application specific integrated circuits (ASIC), microprocessors, discrete analog and digital circuits, and other circuitry. The system circuitry 1404 may implement any desired functionality of the BoM Asset Advisor and its various components. As just one example, the system circuitry 1404 may include one or more instruction processor 1418 and memory 1420.

The memory 1420 stores, for example, control instructions 1422 for executing the features of the BoM Asset Advisor and its various components, as well as an operating system 1421. In one implementation, the processor 1418 executes the control instructions 1422 and the operating system 1421 to carry out any desired functionality for the BoM Asset Advisor and its various components. In another implementation the Control instructions may include passive modules 1423 and active modules 1424. The modules may include instructions that execute to configure the processor to perform the functions of the BoM Advisor Engine or the Milestone Engine.

The computer device 1400 may further include various data sources 1430, or may be in communication with external data sources. Each of the databases that are included in the internal data sources 1430 or external data stores may be accessed by the BoM Asset Advisor and its various components, such as, for example, the Knowledge graph data store, BoM Repository, the Project Repository, and the Materials Inventory.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein may be employed.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

While methods and systems have been described with reference to certain embodiments, it will be understood by those skilled in the art that various changes may be made and equivalents may be substituted without departing from the scope of the claims. For example, in another exemplary implementation, one or more components may correspond to sub-assemblies where each sub-assembly may include components and/or sub-assemblies. In this way, a BoM for a given equipment may correspond to a hierarchical/nested list of components.

Many other modifications may be made to adapt a particular situation or material to the teachings without departing from its scope. Therefore, it is intended that the present methods and systems are not limited to the particular embodiment disclosed, but that the disclosed methods and systems include all embodiments falling within the scope of the appended claims.

We claim:

1. A computer system for automatic generation of a Bill of Materials (BoM) for a new construction project, comprising:
   a memory including instruction code; and
   a processor in communication with the memory, and when executing the instruction code, configured to:
      obtain a plurality of predefined properties associated with the new construction project;
      automatically query a knowledge graph to obtain a population of construction projects with project characteristics that best match the plurality of the predefined properties of the new construction project in a multi-dimensional vector space comprising an embedding space by:
         vectorizing the project characteristics of each of the population of construction projects and the plurality of predefined properties into the embedding space;
         calculating distances between the population of construction projects and the new construction project in the embedding space; and
         obtaining the population of construction projects that are similar to the new construction project in the embedding space by determining whether the population of construction projects are similar to the new construction project;
         wherein the population of construction projects collectively forming a digital representation of the new construction project;
      retrieve, from the knowledge graph, a set of BoMs associated with the population of construction projects; and
      automatically aggregate the set of BoMs to generate a base BoM for the new construction project.

2. The computer system of claim 1, wherein, to automatically aggregate the set of BoMs to generate the base BoM, the processor is configured to select components from the set of BoMs as recorded in the knowledge graph to generate the base BoM for the new construction project in at least one of a plurality of user-selectable optimization modes.

3. The computer system of claim 2, wherein the processor is further configured to deduplicate the components selected from the set of BoMs to generate the base BoM for the new construction project.

4. The computer system of claim 2, wherein the plurality of user-selectable optimization modes comprises a first mode for optimizing a cost of the new construction project, a second mode for optimizing a construction time for the new construction project, and a third hybrid mode of the first mode and the second mode.

5. The computer system of claim 2, wherein the processor is configured to select components from the set of BOMs to generate the base BoM for the new construction project by optimizing a cost of the new construction project projected according to the knowledge graph.

6. The computer system of claim 2, wherein the processor is configured to select components from the set of BoMs to generate the base BoM for the new construction project by optimizing a construction time of the new construction project projected according to at least predicted supplier lead times of the selected components according to the knowledge graph.

7. The computer system of claim 1, wherein, to automatically aggregate the set of BoMs to generate the base BoM, the processor is configured to select components from the set of BoMs as recorded in the knowledge graph according to popularity of the components in the set of BOMs to generate the base BoM for the new construction project.

8. The computer system of claim 1, wherein the processor is further configured to:
   provide a first user interface for modifying the base BoM to generate a modified BoM by selecting additional components from a set of candidate components extracted from the knowledge graph.

9. The computer system of claim 8, wherein the processor is further configured to provide a reason of inclusion as extracted from the knowledge graph for at least one of the set of candidate components in the first user interface.

10. The computer system of claim 8, wherein the processor is further configured to provide a reliability indication as extracted from the knowledge graph for at least one of the set of candidate components in the first user interface.

11. The computer system of claim 8, wherein the processor is further configured to generate a project timeline based on at least component lead times in the base BoM or the modified BoM and provide a second user interface to displaying the project timeline.

12. A method for automatic generation of a BoM for a new construction project, comprising:
   obtaining a plurality of predefined properties associated with the new construction project;

automatically querying a knowledge graph to obtain a population of construction projects with project characteristics that best match the plurality of the predefined properties of the new construction project in a multi-dimensional vector space comprising an embedding space by:
vectorizing the project characteristics of each of the population of construction projects and the plurality of predefined properties into the embedding space;
calculating distances between the population of construction projects and the new construction project in the embedding space; and
obtaining the population of construction projects that are similar to the new construction project in the embedding space by determining whether the population of construction projects are similar to the new construction project;
wherein the population of construction projects collectively forming a digital representation of the new construction project;
retrieving, from the knowledge graph, a set of BoMs associated with the population of construction projects; and
automatically aggregating the set of BoMs to generate a base BoM for the new construction project.

13. The method of claim 12, wherein automatically aggregating the set of BoMs to generate the base BoM comprises selecting components from the set of BoMs as recorded in the knowledge graph to generate the base BoM for the new construction project in at least one of a plurality of user-selectable optimization modes.

14. The method of claim 12, further comprising providing a first user interface for modifying the base BoM to generate a modified BoM by selecting additional components from a set of candidate components extracted from the knowledge graph.

15. A non-transitory computer readable medium for storing instructions, wherein the instructions, when executed by a computer processor, causes the computer processor to:
obtain a plurality of predefined properties associated with a new construction project;
automatically query a knowledge graph to obtain a population of construction projects with project characteristics that best match the plurality of the predefined properties of the new construction project in a multi-dimensional vector space comprising an embedding space by:
vectorizing the project characteristics of each of the population of construction projects and the plurality of predefined properties into the embedding space;
calculating distances between the population of construction projects and the new construction project in the embedding space; and
obtaining the population of construction projects that are similar to the new construction project in the embedding space by determining whether the population of construction projects are similar to the new construction project;
wherein the population of construction projects collectively forming a digital representation of the new construction project;
retrieve, from the knowledge graph, a set of BoMs associated with the population of construction projects; and
automatically aggregate the set of BoMs to generate a base BoM for the new construction project.

16. The non-transitory computer readable medium of claim 15, wherein, to automatically aggregate the set of BoMs to generate the base BoM, the instructions cause the computer processor to select components from the set of BoMs as recorded in the knowledge graph to generate the base BoM for the new construction project in at least one of a plurality of user-selectable optimization modes.

17. The non-transitory computer readable medium of claim 15, wherein the instructions further cause the computer processor to provide a first user interface for modifying the base BoM to generate a modified BoM by selecting additional components from a set of candidate components extracted from the knowledge graph.

* * * * *